P. Hinkle,
Bed Bottom,

N°. 80,176.   Patented July 21, 1868.

United States Patent Office.

PHILIP HINKLE, OF SAN FRANCISCO, CALIFORNIA.

Letters Patent No. 80,176, dated July 21, 1868.

IMPROVED BED-BOTTOM.

The Schedule referred to in these Letters Patent and making part of the same.

TO ALL WHOM IT MAY CONCERN:

Be it known that I, PHILIP HINKLE, of the city of San Francisco, in the State of California, have invented a new and useful Improvement on Spring-Bed Bottoms or bedstead-bottoms; and I do hereby declare that the following is a full, clear, and exact description of the same, reference being had to the accompanying drawings, and to the letters and marks thereon, which said drawings show a bedstead, with the bottom thereof constructed under my invention—

Figure 1:
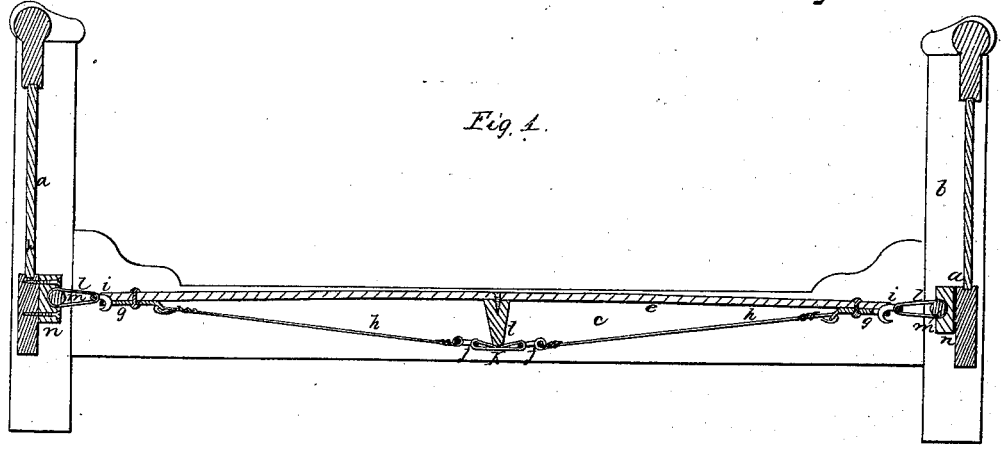
Figure 2:
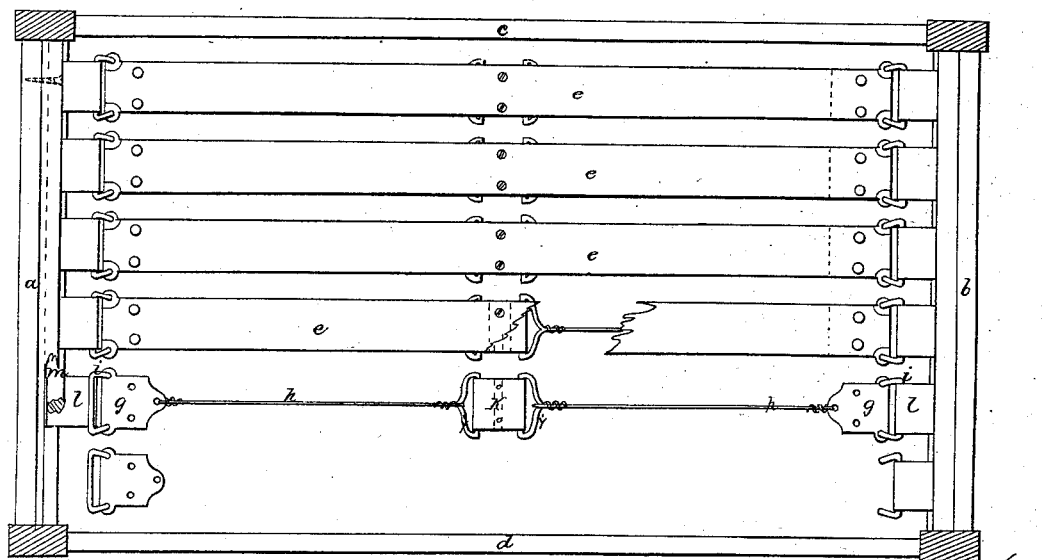

Figure 1 being a longitudinal sectional view, and
Figure 2 a top view.

In both of these figures like marks and letters are used to indicate like parts.

My invention may properly be termed a wire suspension or truss-spring bottom, as it has both the spring and the truss attached to each strip or slat.

The ends of the bedstead are marked $a$ and $b$, and the sides $c$ and $d$.

The slats $e$ are springs of wood, or may be of metal, having at the centre or arch a bridge, $f$, secured by a screw or other suitable means. At each end of the slats are affixed metal plates, $g$, with holes for the wires $h$ and for the hooks $i$. The inner ends of the wires $h$ are connected to the suspenders $j$, and between the suspenders is the elastic band $k$, directly under the bridge $f$. The hooks $i$ are attached to elastic strips or bands, $l$, through which bands a rod or bar, $m$, is passed, which rod or bar is secured in a recess in the cross-bar $n$ of the head-board $o$ on the one end, and of the foot-board $p$ on the other end of the bedstead. These rods $m$ are shown connected to the cross-bar by screws, but they may be held in the recess by any other suitable means. This manner of connecting the slats to the bedstead is very easy and convenient, and allows of easy removal for repairs of any one or more of the slats.

The whole arrangement of the slats, and the pieces and parts connected to or with them, affords a soft and very comfortable bottom.

I contemplate, in some instances, to substitute, for the plate $g$ and hooks $i$, a connecting-device that will be like the common harness-buckle, without the tongue, which could easily be fitted in a groove in the end or near the end of the slat, and the end of the wires $h$ could be twisted around the slat, and held by a pin or screw, which would be perhaps cheaper than the plates and hooks.

What I claim as my invention, and desire to secure by Letters Patent, is—

The combination of the rod $m$ in the recess, bands $l$ and $k$, suspenders $j$, bridge $b$, wires $h$, and slats $e$, as herein set forth.

This specification signed, this 6th day of April, A. D. 1868.

PHILIP HINKLE.

Witnesses:
J. W. McKENZIE,
JOHN L. SAMUELS.